UNITED STATES PATENT OFFICE.

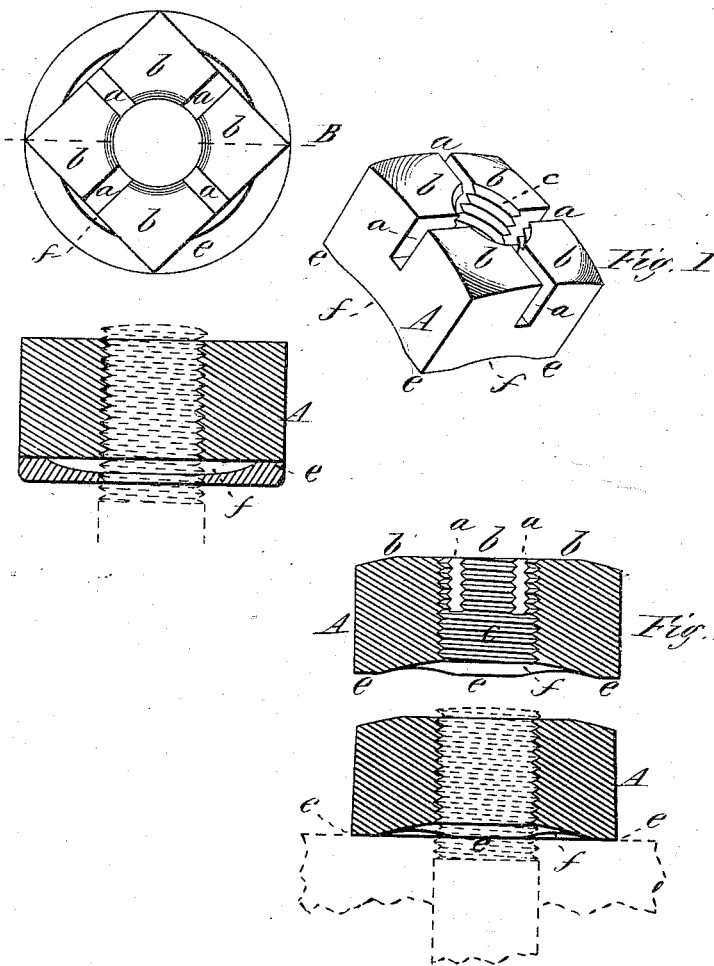

JAMES B. ATWOOD, OF WILBRAHAM, MASSACHUSETTS.

IMPROVEMENT IN NUT-LOCKS.

Specification forming part of Letters Patent No. 168,597, dated October 11, 1875; application filed September 3, 1875.

*To all whom it may concern:*

Be it known that I, JAMES B. ATWOOD, of Wilbraham, in the State of Massachusetts, have invented a new and useful Improved Nut-Lock; and that the following is a full, clear, and exact description thereof, reference being had to the accompanying drawing, making a part of this specification and description.

The object of my invention is to prevent the nut from becoming loosened upon the bolt by any jar which the bolt or nut, or both, may be submitted to after the nut has once been turned up to its bearing; and to this end my invention consists of a nut having slots or recesses made in its outer face to a proper depth, and having its inner face, or that which comes next its bearing, recessed, whereby the corners of that face, all or any number of them, project beyond the recessed part, so that when the nut is turned onto a bolt with the projecting corners firmly up to a bearing, the parts into which the outer portion of the nut is divided by the slots or recesses in its outer face will be forced inward and gripe the thread of the bolt tightly, and the nut will thereby be prevented from turning off or becoming loose from any jar.

Figure I is a perspective view of a nut made according to my invention. Fig. II is a transverse section diagonally across the nut from one corner to the opposite one, at line B. Fig. III is also a similar section, but showing the nut as applied to a bolt and turned against a flat bearing, the projecting part, which throws the divided portion of the nut inward, being made upon the nut; and Fig. IV represents a plan and side view of a nut as turned against a washer, with the projecting part made upon the washer, instead of upon the nut.

In the drawings, A represents the nut, having the threaded hole *c* to fit the bolt properly, and across the outer face of the nut are made the slots or cavities *a*, of a suitable depth, and crossing the threaded hole *c*, and dividing the nut into any desirable number of parts *b*. The base or lower face of the nut is recessed at *f*, or is made of such concave or other form that a small part, *e*, opposite the division *b*, projects beyond the general plane of the face *f*. Instead of the projecting part *e* being made upon the nut at its bearing end, a washer might be used, having an annular projecting rim, *e*, with the general face of the washer recessed, so that when the nut (which then might be made flat at its bearing end) is turned against the washer the bearing will be at the corners of the nut, and the divisions *b* will be thrown in to gripe the bolt, as before, the principle of operation, in both cases, being precisely alike.

The operation of the invention is as follows: F, in dotted lines, Fig. III, represents any firm object, through which the bolt is inserted, and against the face of which the nut is to be turned. When the nut is turned onto the bolt so as to bring the parts *e* firmly against a bearing, the slots or cavities *a*, being made of a proper depth—say, from half to three-fourths the depth of the nut—the parts *b*, into which the nut is divided by the slots *a*, will be bent or thrown inward against the threaded part of the bolt, and will gripe it so firmly that no jar will start it, to turn it back from its bearing or loosen it; in fact, considerable force will be required to turn it back with a wrench, and the closer the nut is turned up against its bearing the greater force will be required to turn it back.

Four slots or cavities, *a*, are shown in the drawing, which, for ordinary uses, are quite sufficient, one each on opposite sides of the threaded hole *c;* but it is evident that any number of these slots may be used—one slot across the outer face of the nut, to divide it into only two parts, *b*, being quite sufficient for some purposes, while more may be made when desirable.

It is also evident that any form of recess in the lower face of the nut to leave the projecting parts *e* will accomplish the same result—as, for example, the face of the recess *f* might be flat instead of concave, as shown in the drawing; but the part *e* projecting beyond the plane or face of the recessed part, the division b would be forced inward against the threaded part of the bolt.

Having thus described my invention, what I claim as new is—

An improved nut-lock, having its outer end or face provided with one or more slots or cavities, a, dividing that portion of the nut into two or more divisions, b, in combination with the projecting part e at the bearing, opposite the divisions b, whereby the latter is thrown inward against the threaded portion of the bolt when the nut is turned up to a bearing, substantially as described.

JAMES B. ATWOOD.

Witnesses:
T. A. CURTIS,
C. E. BUCKLAND.